S. M. GRIFFITH.
SKIRT GAGE AND HEM REGULATOR.
APPLICATION FILED NOV. 1, 1910.
1,002,581.
Patented Sept. 5, 1911.
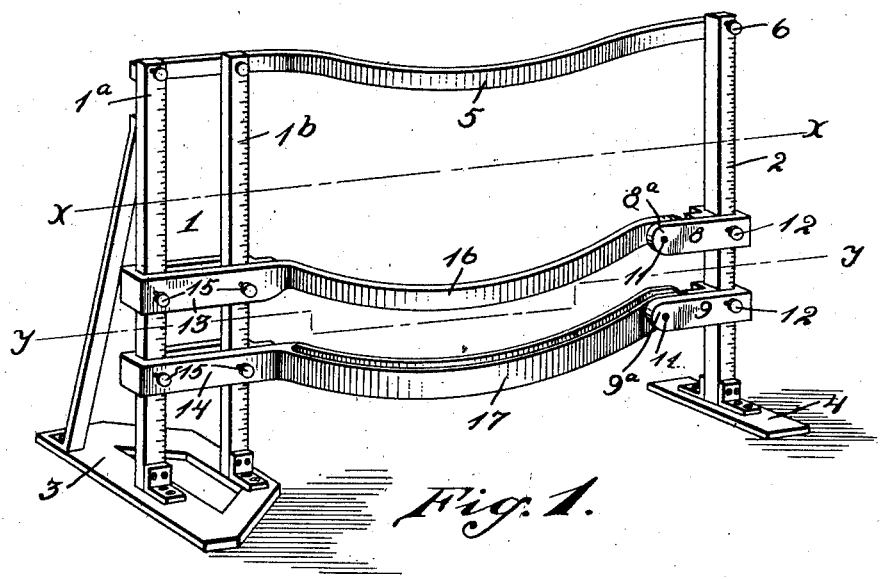
Fig. 1.
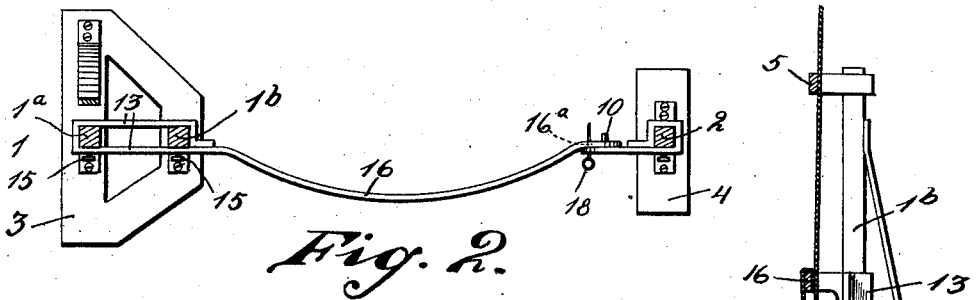
Fig. 2.
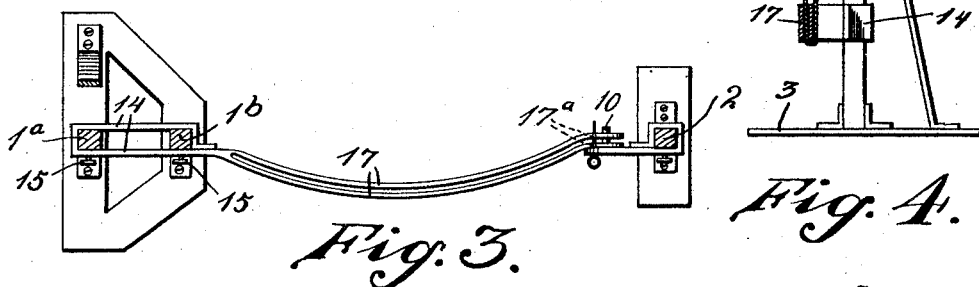
Fig. 3.
Fig. 4.
Witnesses
Inventor
Sadie M. Griffith
By
Attorney

UNITED STATES PATENT OFFICE.

SADIE M. GRIFFITH, OF CLOVERDALE, INDIANA.

SKIRT-GAGE AND HEM-REGULATOR.

1,002,581.  Specification of Letters Patent.  Patented Sept. 5, 1911.

Application filed November 1, 1910.  Serial No. 590,163.

*To all whom it may concern:*

Be it known that I, SADIE M. GRIFFITH, a citizen of the United States, residing at Cloverdale, in the county of Putnam and State of Indiana, have invented certain new and useful Improvements in Skirt-Gages and Hem-Regulators, of which the following is a specification.

My invention relates to devices for gaging the length of skirts and regulating the width of the hem thereon, and has for its object the provision of a device capable of adjustment so that the operator may make a skirt even around its lower edge and at the same time make the hem of any desired width, the two operations being performed at one and the same time.

My invention will be described in detail hereinafter and illustrated in the accompanying drawing, in which—

Figure 1 is a front view in perspective of my improved device, Fig. 2, a horizontal sectional view on the line $x$—$x$ of Fig. 1, Fig. 3, a horizontal sectional view on the line $y$—$y$ of Fig. 1, and Fig. 4, a vertical sectional view showing the skirt in position.

In the drawing similar reference characters indicate corresponding parts in the several views.

My invention comprises upright supports 1 and 2, support 1 consisting of two bars $1^a$ and $1^b$ mounted on a base 3 and spaced apart as shown, while support 2 consists of the single bar, as shown, and secured to base 4. All of said bars $1^a$, $1^b$ and 2 being marked as shown with inches and fractions.

5 indicates a cross bar secured to bars $1^a$ and $1^b$ and pivotally secured to bar 2 as shown at 6.

8 and 9 indicate sleeves slidably mounted on bar 2 and having extensions $8^a$ and $9^a$ respectively to which are secured lugs or pins 10 and which are provided with holes 11. The sleeve 8 and 9 are secured in adjusted positions on bar 2 by means of set screws 12.

13 and 14 indicate sleeves mounted on upright 1 and secured in adjusted positions thereon by means of set screws 15.

16 indicates an arm extending from sleeve 13 and having a hole $16^a$ in its outer end, and 17 a bifurcated arm extending from sleeve 14, and $17^a$ designates holes in the outer ends of the prongs of arm 17. Arms 16 and 17 as well as cross bar 5 between the uprights 1 and 2 are preferably formed bowed as shown so that they nearly conform to the circumference of the skirt to be measured.

In using the device the skirt to be fitted is placed on the wearer or lay figure with its inside out, and against the concave sides of the cross bar 5 and arms 16 and 17, said arms having previously been adjusted so that the lower edge of arm 17 is at the height desired for the bottom of the skirt, and the arm 16 at the height desired for the upper edge of the hem. The bottom of the skirt is then inserted between the prongs of arms 17, then up and over the arm 16 and the free edge of the skirt folded downwardly between the arm and skirt. The arms 16 and 17 are then secured to extensions $8^a$ and $9^a$ of sleeves 8 and 9 respectively by means of pins 18 inserted through the cloth of the skirt and holes 11 and $16^a$ and $17^a$. The hem is then basted the length of the arms 16 and 17, the pins 18 removed and the skirt moved along so that another section may be gaged and regulated, the operation described being repeated. It is apparent that the arm 17 being formed bifurcated as stated and the skirt being inserted between the prongs of the arm serves to securely hold the goods so as to prevent slipping while the operator is basting the hem, and that the device is also adapted to making tucks if desired. The lugs or pins 10 serve to support the free ends of arms 16 and 17 when the pins 18 are not in position in holes 11, $16^a$ and $17^a$.

Having thus described my invention, what I claim is:

1. In a skirt gage and hem regulator, an arm extending in the direction of the skirt and substantially parallel with its bottom, said arm being bifurcated to engage the skirt.

2. In a skirt gage and hem regulator, uprights, an arm slidably mounted on said uprights, said arm extending in the direction of the skirt and substantially parallel with its bottom and bifurcated to engage the skirt and hold it in position.

3. In a skirt gage and hem regulator, uprights spaced apart, arms mounted on said uprights, one of said arms being bifurcated and adapted to mark the bottom of the skirt, and the other arm adapted to mark the top of the hem.

4. In a skirt gage and hem regulator, uprights spaced apart, sleeves slidably mounted on one upright, arms slidably mounted on the other upright, and means to temporarily secure said arms to the sleeves.

5. In a skirt gage and hem regulator, uprights spaced apart, sleeves slidably mounted on one upright, arms slidably mounted on the other upright, said arms and sleeves being formed with holes, and pins engaging said holes to hold the arms and sleeves in engagement.

6. In a skirt gage and hem regulator, uprights spaced apart, sleeves slidably mounted on one upright, arms slidably mounted on the other upright, one of said arms being bifurcated, said sleeves and arms being formed with holes, and pins engaging said holes to hold the arms and sleeves in engagement.

7. A skirt gage and hem regulator comprising uprights spaced apart, a cross-bar secured to the tops of said uprights, sleeves adjustably mounted on one of said uprights, said sleeves being formed with extensions having holes therein, pins or lugs secured to said extensions, arms adjustably mounted on the other upright, one of said arms being bifurcated, the free ends of said arms having holes therein, and pins adapted to engage the holes in the arms and sleeve extensions.

In testimony whereof I hereto affix my signature in the presence of two witnesses.

SADIE M. GRIFFITH.

Witnesses:
T. C. UTTERBACK,
IVONA CARR.

Copies of this patent may be obtained for five cents each, by addressing the "Commissioner of Patents, Washington, D. C."